(12) United States Patent
Inamura et al.

(10) Patent No.: US 10,741,854 B2
(45) Date of Patent: Aug. 11, 2020

(54) METHOD OF MANUFACTURING PLATE WITH FRAME

(71) Applicants: NOK CORPORATION, Tokyo (JP); HONDA MOTOR CO., LTD., Tokyo (JP)

(72) Inventors: Tamio Inamura, Kikugawa (JP); Shuhei Goto, Wako (JP); Akihito Giga, Wako (JP); Satoshi Oyama, Wako (JP)

(73) Assignees: NOK CORPORATION (JP); Honda Motor Co., Ltd. (JP)

( * ) Notice: Subject to any disclaimer, the term of this patent is extended or adjusted under 35 U.S.C. 154(b) by 303 days.

(21) Appl. No.: 15/211,513

(22) Filed: Jul. 15, 2016

(65) Prior Publication Data
US 2017/0015035 A1    Jan. 19, 2017

(30) Foreign Application Priority Data

Jul. 17, 2015  (JP) .................................. 2015-142966
Mar. 7, 2016   (JP) .................................. 2016-043271

(51) Int. Cl.
| | | |
|---|---|---|
| *B29C 45/14* | (2006.01) | |
| *H01M 8/0276* | (2016.01) | |
| *B29C 45/27* | (2006.01) | |
| *H01M 8/0273* | (2016.01) | |
| *H01M 8/0206* | (2016.01) | |

(Continued)

(52) U.S. Cl.
CPC ..... *H01M 8/0276* (2013.01); *B29C 45/14311* (2013.01); *B29C 45/14336* (2013.01); *B29C 45/2708* (2013.01); *H01M 8/0206* (2013.01); *H01M 8/0273* (2013.01); *B29C 2045/2709* (2013.01); *B29K 2705/00* (2013.01); *B29L 2031/3468* (2013.01); *Y02P 70/56* (2015.11)

(58) Field of Classification Search
CPC ........ B29C 45/14336; B29C 45/14344; B29C 2045/14352; B29C 2045/14368
See application file for complete search history.

(56) References Cited

U.S. PATENT DOCUMENTS

| | | | |
|---|---|---|---|
| 6,382,672 B1 | 5/2002 | Minami et al. | |
| 7,063,911 B1* | 6/2006 | Nagai ............... | B29C 45/14344 |
| | | | 429/435 |

(Continued)

FOREIGN PATENT DOCUMENTS

| | | |
|---|---|---|
| JP | S50-098963 A | 8/1975 |
| JP | S52-074662 A | 6/1977 |

(Continued)

*Primary Examiner* — Ryan M Ochylski
(74) *Attorney, Agent, or Firm* — Harness, Dickey & Pierce, P.L.C.

(57) ABSTRACT

A method of manufacturing a plate with an insulating frame by using a metal mold. The plate includes an outer edge portion having a concavo-concave shape, and the metal mold includes a plurality of gate portions for injecting a molding material that forms the frame. The gate portions of the metal mold are at locations that correspond to the concave portions of the metal plate such that when the molding material is injected into the metal mold, an injection pressure of the molding material that can deform the metal plate will not deform the metal plate to an extent that deteriorates insulation resistance that is provided by the frame.

4 Claims, 8 Drawing Sheets

(51) Int. Cl.
*B29K 705/00* (2006.01)
*B29L 31/34* (2006.01)

(56) References Cited

U.S. PATENT DOCUMENTS

2004/0038639 A1* 2/2004 Yasuno ............. B29C 45/14336
454/69
2009/0162635 A1 6/2009 Wada et al.

FOREIGN PATENT DOCUMENTS

| | | |
|---|---|---|
| JP | S57-089944 A | 6/1982 |
| JP | 2006-142622 A | 6/2006 |
| JP | 2006-159862 A | 6/2006 |
| JP | 2009-269248 A | 11/2009 |
| JP | 2009-274308 A | 11/2009 |
| JP | 2014-203553 A | 10/2014 |
| WO | WO-2006-054504 A1 | 5/2006 |

* cited by examiner

METHOD OF MANUFACTURING PLATE WITH FRAME

FIELD

The present invention relates to a method of manufacturing a plate with a frame by using a metal mold. The plate is obtained by integrally molding a resin frame in an outer edge portion of a metal plate. The manufacturing method according to the present invention is used, for example, in a process of manufacturing a gasket (a plate integrated gasket) for a fuel cell, or is used in a process of manufacturing a general gasket (a plate integrated gasket).

BACKGROUND

Figure 7:
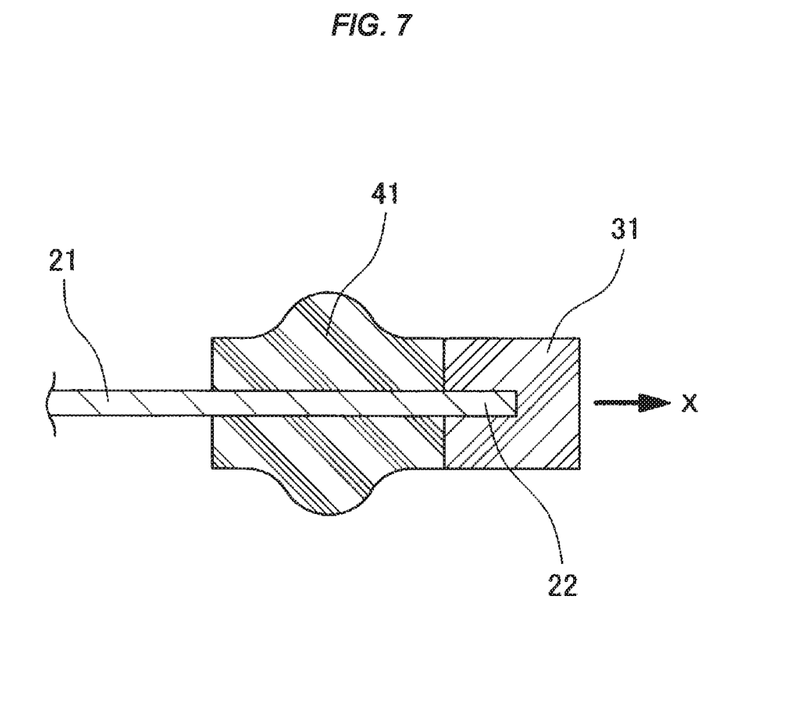
FIG. 7 is a partly cross sectional view of a gasket for a fuel cell (a plate integrated gasket) having a plate with frame which is manufactured by a manufacturing method according to a prior art.

In a case where a gasket made of a rubber-like elastic material is integrally molded to an outer edge portion of a metal separator for a fuel cell which serves as a metal plate, a rubber burr is generated in an outer peripheral portion of a molded product. As a result, a significant number of man hours are required for removing the burr. To offset this, there is a procedure according to the conventional art where resin frame 31 is integrally molded to an outer edge portion (a right end portion in the drawing) 22 of a metal separator 21, and then a gasket 41 made of a rubber-like elastic material is integrally molded to an inner side of the resin frame 31 (an inner peripheral side, a left side in the drawing) while setting the resin frame 31 to a dam portion against the rubber burr generation, as shown in FIG. 7.

According to this conventional procedure, however, there is a fear that the resin frame 31 will separate from the outer edge portion 22 of the metal separator 21 in a stage that the resin frame 31 is integrally molded to the outer edge portion 22 of the metal separator 21 (i.e., a stage that the gasket 41 made of the rubber-like elastic material is not molded yet) (a separation direction is shown by an arrow X).

Figure 8A:
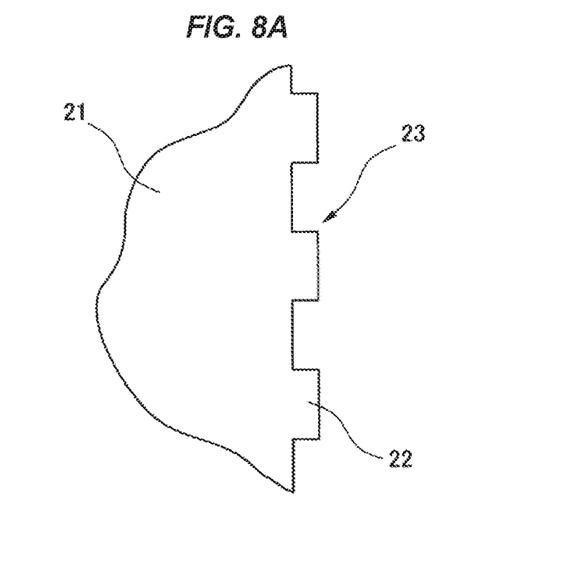
FIG. 8A is a partly plan view of the same.

In order to prevent the separation, it is thought that a concavo-convex shape 23 having a lot of concavities and convexities formed side by side should be provided to the outer edge portion 22 of the metal separator 21 such that when the resin frame 31 is integrally molded to the outer edge portion 22 of the metal separator 21 having the concavo-convex shape 23 (as shown in FIG. 8A) there is an increase of contact area between the metal separator 21 and the resin frame 31.

Figure 8B:
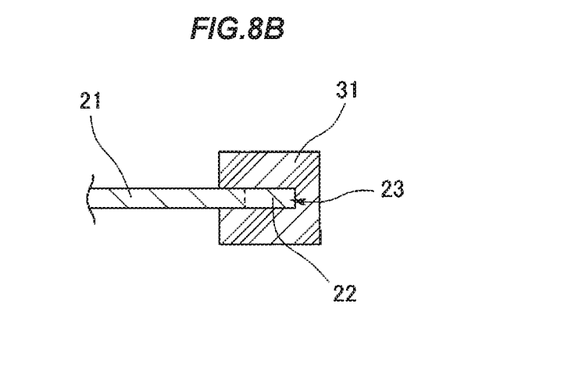
FIG. 8B is a partly cross sectional view.
Figure 8C:
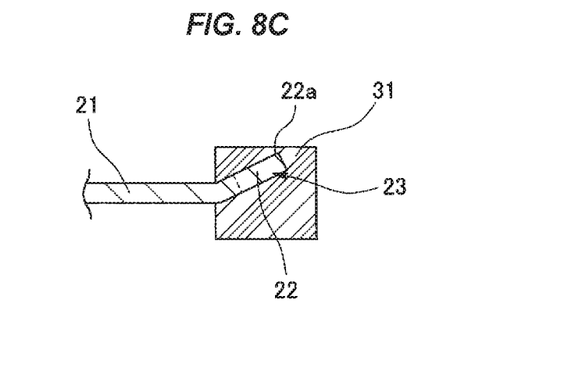
FIG. 8C is a partly cross sectional view of a state in which a plate outer edge portion is deformed.

However, when the resin frame 31 is integrally molded to the outer edge portion 22 of the metal separator 21 having the concavo-convex shape 23, the metal separator 21 is set to a parting portion of a metal mold for molding the resin frame 31, and a resin molding material for molding the resin frame 31 is next injected into a metal mold cavity. Meanwhile, the metal separator 21 is an extremely thin plate because the fuel cell industry requires a compact structure for the fuel cell, and tends to be deformed (plastically deformed) by the application of an external force due to its thinness. Accordingly, in the molded product obtained by integrally molding the resin frame 31 to the outer edge portion 22 of the metal separator 21 having the concavo-convex shape 23, the outer edge portion 22 of the metal separator 21 should be buried in the middle in a thickness direction of the resin frame 31 in a normal situation without deformation of the outer edge portion 22 of the metal separator 21 as shown in FIG. 8B. The outer edge portion 22 of the metal separator 21, however, may be deformed under the influence of a resin molding material injecting pressure as shown in FIG. 8C. If a leading end 22a of the outer edge portion 22 is exposed to a surface in relation to the resin frame 31 as a result of deformation, there is a risk that an electric insulation, which is important in the fuel cell, is deteriorated.

SUMMARY

The present disclosure provides a method of manufacturing a plate with a frame. The method is structured such that the resin frame is resistant to separating from an outer edge portion of a metal plate, and an amount of deformation can be reduced even when deformation is generated in the outer edge portion of the plate when the resin frame is integrally molded to the outer edge portion of the metal plate.

More specifically, the present disclosure provides a method of manufacturing a plate with a frame by using a metal mold. The plate is obtained by integrally molding a resin frame to an outer edge portion of a metal plate, wherein the metal plate is provided with a concavo-convex shape for making the resin frame resistant to separating from the outer edge portion of the metal plate. The metal mold is provided with a cavity portion for molding the resin frame in a state in which the metal plate is set within the metal mold, and a frame molding material is injected into the cavity portion from a gate portion, wherein the gate portion is constructed by a plurality of gate portions that are provided at positions that face an outer edge thickness surface of the metal plate, and are arranged at positions that correspond to locations of concave portions of the concavo-convex shape. The plate is, for example, a metal separator for a fuel cell, and the frame is, for example, a resin frame that is integrally molded to the outer edge portion of the metal separator.

Because the metal plate is provided with the concavo-convex shape on the outer edge portion thereof, a contact area between the metal plate and the resin frame is increased when the resin frame is integrally molded to the outer edge portion of the metal plate in comparison to when the concavo-convex shape is not provided. Therefore, the resin frame is resistant to separating from the outer edge portion of the metal plate.

The gate portions are provided at locations that face the outer edge thickness surface of the metal plate, and are arranged at the positions that correspond to the locations of the concave portions in the concavo-convex shape. As a result, the portion having the concave portions in the concavo-convex shape of the metal plate tend to be deformed under the influence of injecting pressure of the frame molding material when the frame molding material is injected from the gate portion to the outer edge portion of the metal plate. Here, since the portion having the concave portions in the metal plate is smaller in a protruding length protruding to a cavity inner portion in comparison with the portion having the convex portions (a length of a portion which is held in a cantilever manner in the metal mold is small), an amount of deformation can be reduced even after deformation that may result due to the injecting pressure of the frame molding material. Therefore, it is possible to prevent the leading end of the outer edge portion from being exposed to the surface in relation to the resin frame due to the large deformation of the outer edge portion of the metal plate.

Further, the present disclosure provides a method of manufacturing a plate with a frame by using a metal mold, wherein the plate is obtained by integrally molding a resin frame to an outer edge portion of a metal plate. The metal plate is provided with a concavo-convex shape for making the resin frame resistant to separating from the outer edge portion of the metal plate, the metal mold is provided with a cavity portion for molding the resin frame in a state in which the metal plate is set to the metal mold, and a gate portion for injecting a frame molding material into the cavity portion. The gate portion is constructed by a plurality of gate portions which are provided at positions that face an outer edge thickness surface of the metal plate in a state of being set to the metal mold, weld portions which are positioned between a plurality of gate portions and where flow of the frame molding materials meet together are set in the resin frame formed by the cavity portion, the metal mold is provided with a structure in which arrangement of the weld portions in the metal mold correspond to an arrangement of the concave portions in the concavo-convex shape of the metal plate in a state of being set to the metal mold, and the plate with the frame is manufactured by using the metal mold (claim 2). The plate is, for example, the metal separator for the fuel cell, and the frame is, for example, the resin frame which is integrally molded in the outer edge portion of the metal separator.

In the method mentioned above, the metal plate is provided with the concavo-convex shape on the outer edge portion thereof. As a result, a contact area between the metal plate and the resin frame is greater when the resin frame is integrally molded to the outer edge portion of the metal plate in comparison to when the concavo-convex shape is not provided. Therefore, the resin frame is resistant to separating from the outer edge portion of the metal plate.

Further, the metal plate is larger in its peripheral length in comparison to its thickness. Accordingly, in connection with the provision of a plurality of gate portions being provided in the peripheral direction of the metal mold, the weld portions where the flow of the frame molding materials meet together are set in the resin frame molded in the cavity portion so as to be positioned between a plurality of gate portions. However, a pressure (a combined flow pressure) caused by the materials meeting together is generated in the weld portions, and the combined flow pressure acts on the outer edge portion of the metal plate. Accordingly, the weld portions are arranged at positions which correspond to the arrangement of the concave portions in the concavo-convex shape of the metal plate. As a result, the portion of the metal plate having the concave portions tend to be deformed under the influence of the combined flow pressure when the combined flow pressure is applied to the outer edge portion of the metal plate. Here, since the portion having the concave portions in the metal plate is smaller in a protruding length that protrudes to a cavity inner portion in comparison to the portion having the convex portions (a length of a portion which is held in a cantilever manner in the metal mold is small), an amount of deformation can be reduced even after the deformation under the influence of injecting pressure of a frame molding material. Therefore, it is possible to prevent a matter that the outer edge portion of the metal plate is greatly deformed and the leading end of the outer edge portion is exposed to the surface in relation to the resin frame from being generated.

Further, it is thought that the influence of injecting pressure of the frame molding material acting on the metal plate is reduced by enlarging the width of the resin frame molded by the metal mold in the portion including the weld portion in comparison to the other portions so as to set a circumferentially partly frame width enlargement portion in the resin frame.

Effect of the Invention

According to the present invention, the resin frame is resistant to separating from the outer edge portion of the metal plate. Further, even if deformation is generated in the plate outer edge portion when the resin frame is integrally molded to the outer edge portion of the metal plate, it is possible to reduce the amount of deformation.

BRIEF DESCRIPTION OF THE DRAWINGS

FIGS. 2A and 2B are partly cross sectional views of the gasket, in which

FIGS. 3A and 3B are partly cross sectional views of the plate with frame, in which FIG. 2B is an enlarged cross sectional view along the line B-B in FIG. 1;

FIGS. 8A and 8B are views showing a metal plate according to a reference example, in which

DETAILED DESCRIPTION

The following embodiments are included in the present disclosure.

(1) Because a rubber burr may be generated in an outer peripheral portion when rubber molding the separator integrated gasket obtained by vulcanizing the rubber to the metal separator, a significant number of man hours are required to remove the burrs. According to the present disclosure, however, the generation of rubber burrs can be reduced by molding the resin frame to the outer peripheral portion of the metal separator. On the other hand, there is a case that insulation performance cannot be reliably secured due to the deformation of the metal separator when molding the outer peripheral resin frame to the metal separator.

(2) The outer peripheral resin frame has a concavo-convex shape along an entire length of the metal separator outer peripheral portion to reduce separation of the gasket from the metal separator after the gasket is molded. However, since it is necessary to make the separator for the fuel cell thin, the thickness of the resin frame must also be thinned. Therefore, it is necessary to arrange a plurality of cold gates over an entire periphery of the metal mold to ensure resin fluidity when molding the resin. Further, the deformation in the outer periphery of the metal separator is greatly affected by the resin flow since it is generated at the time of resin molding, and is frequently generated in the cold gate and the weld portion, and the deformation is under the influence of the flow at the time of resin molding.

(3) According to the present disclosure, both or one of the cold gate and the weld portion is arranged in the concave portion on the outer periphery of the metal separator.

(4) It is assumed that the flow influence at the time of resin molding is greater than the other sections. The amount of deformation is reduced due to the influence of the dimensional shape in relation to the convex portion even in the case that the deformation is generated at the section, by arranging both or one of the cold gate and the weld portion, where deformation generation frequency is actually higher, in the concave portion in the outer periphery of the metal separator. As a result, it is possible to reduce the possibility that a fixed level or more deformation is generated as a whole.

Embodiments

Next, a description will be given to embodiments according to the present disclosure with reference to the accompanying drawings.

Figure 1:
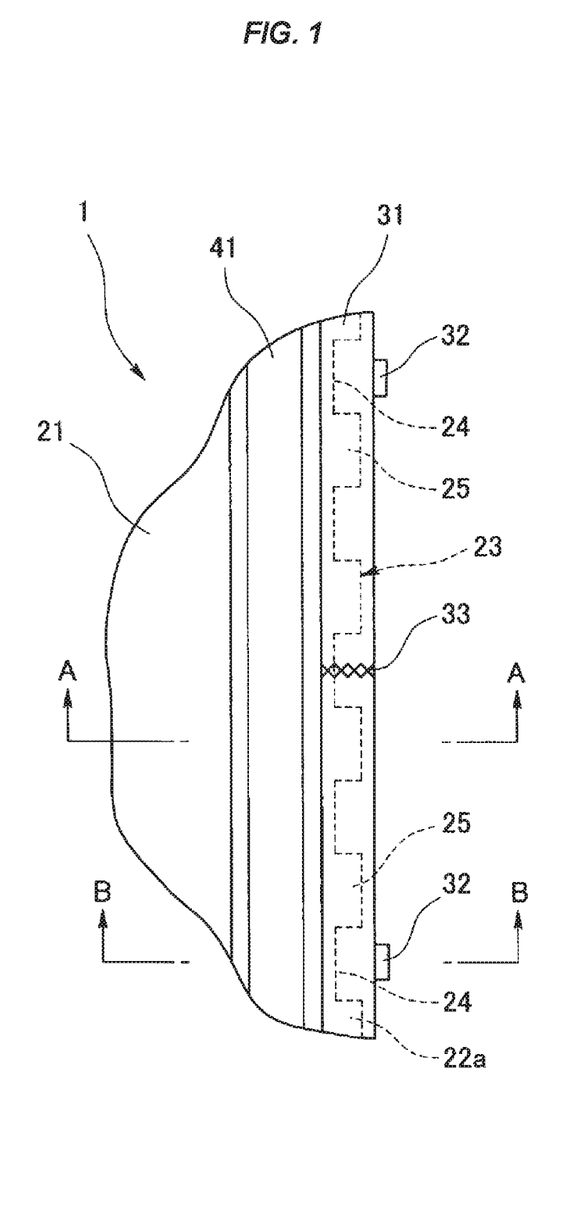
FIG. 1 is a partly plan view of a gasket for a fuel cell (a plate integrated gasket) having a plate with frame which is manufactured by a manufacturing method according to an embodiment of the present disclosure.
Figure 2A:
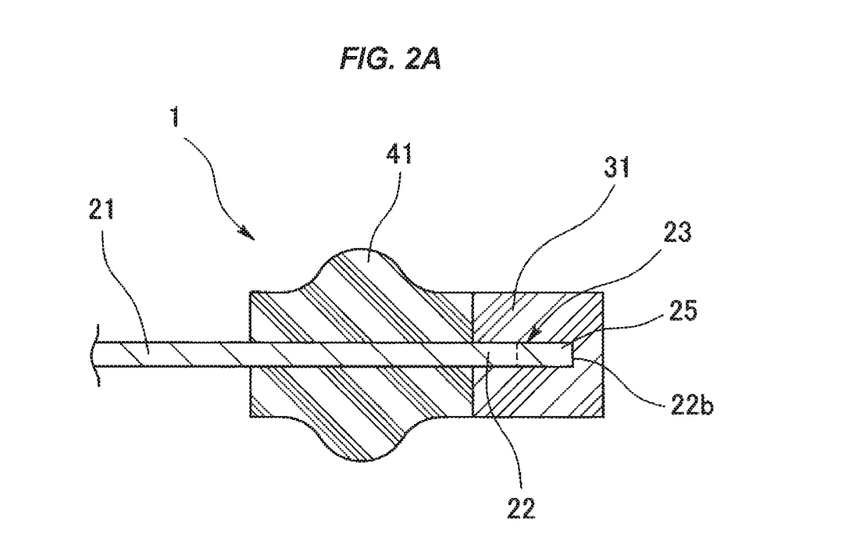
FIG. 2A is an enlarged cross sectional view along a line A-A in FIG. 1.
Figure 2B:
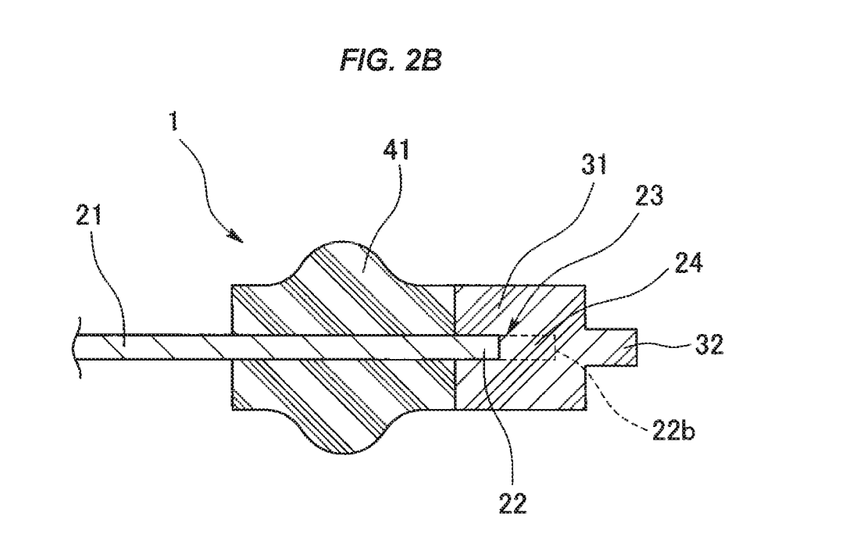
FIG. 2B is an enlarged cross sectional view along a line B-B in FIG. 1.
Figure 3A:
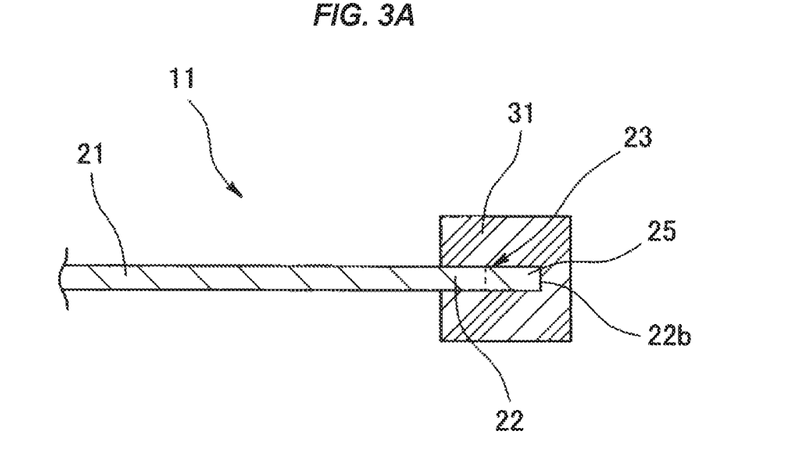
FIG. 3A is an enlarged cross sectional view along the line A-A in FIG. 1.
Figure 3B:
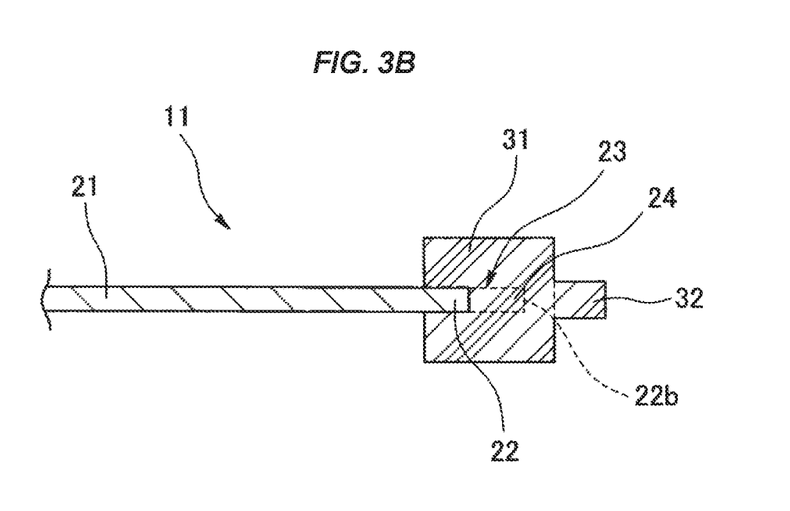
Figure 4:
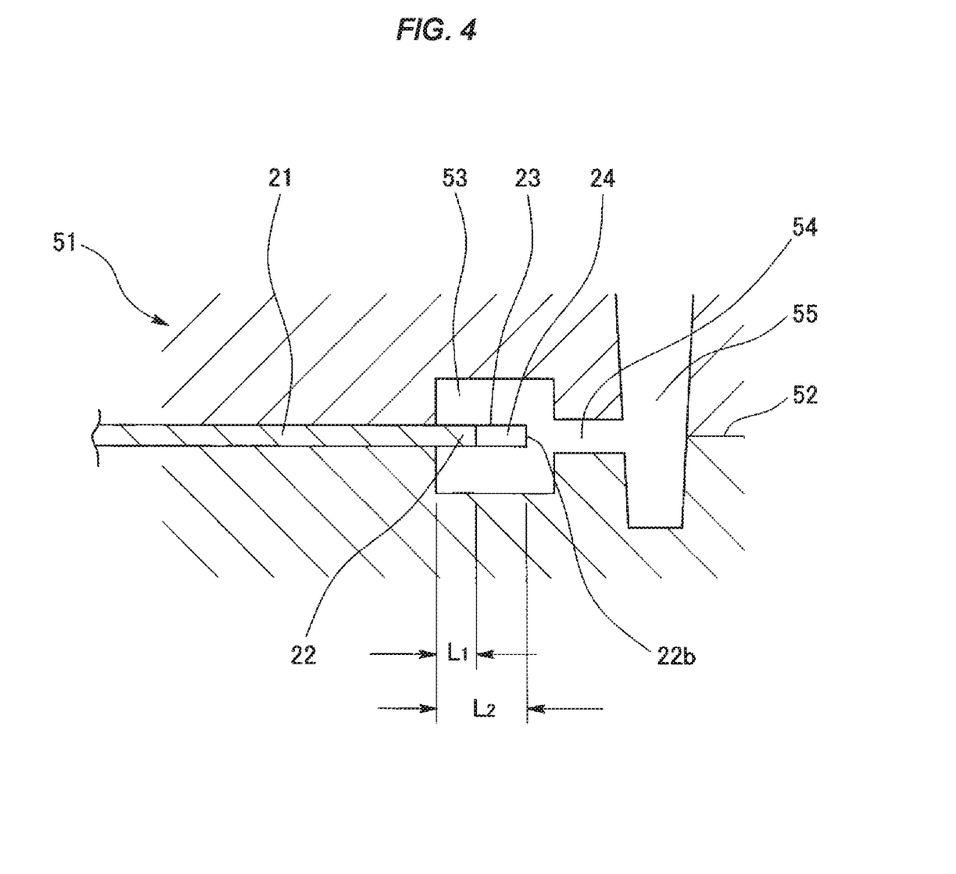
FIG. 4 is an explanatory view of a manufacturing step of the plate with frame.

In a manufacturing method according to the present disclosure, a plate 11 with a frame shown in FIG. 3 is manufactured by using a metal mold 51 that is shown in FIG. 4 as a requisite to manufacturing a gasket 1 for a fuel cell as shown in FIGS. 1 and 2. The plate 11 with a frame shown in FIG. 3 is obtained by integrally molding a resin frame 31 to an outer edge portion (a right end portion in the drawing) 22 of a metal separator 21, which corresponds to a metal plate. The gasket 1 for the fuel cell shown in FIGS. 1 and 2 is obtained by integrally molding a gasket (a gasket main body) 41 made of a rubber-like elastic material on each opposing major surface in a thickness direction of the metal separator 21, and an inner side (an inner peripheral side, a left side in the drawing) of the resin frame 31 in an outer edge portion (a right end portion in the drawing) of the plate 11 with frame in FIG. 3. Therefore, first of all, the plate 11 with frame shown in FIG. 3 is manufactured, and the gasket 41 for the fuel cell shown in FIGS. 1 and 2 is manufactured in a subsequent step. A description will be given below to the method of manufacturing the plate 11 with frame shown in FIG. 3.

The metal separator 21 corresponding to the metal plate is provided with a predetermined planar shape, and is provided with a concavo-convex shape 23 including a plurality of concave portions 24 and convex portions 25 along an outer edge portion 22 as shown in FIG. 1. Since the concavo-convex shape 23 is buried in the resin frame 31 as shown in FIG. 3, a contact area between the metal separator 21 and the resin frame 31 is increased, which results in a structure in which the resin frame 31 is resistant to separating from the outer edge portion 22 of the metal separator 21.

The plate 11 with frame is manufactured by a metal mold 51 which is schematically shown in FIG. 4. The metal mold 51 is provided with a parting surface 52 and a cavity portion 53 for molding the resin frame 31 when the metal separator 21 is provided within the metal mold 51, and the cavity portion 53 is provided with a gate portion (a cold gate) 54 which is set for injecting a frame molding material into the cavity portion 53 and is connected to a runner portion 55.

The gate portion 54 is provided at a position that faces an outer edge thickness surface 22b of the metal separator 21. Therefore, an injecting pressure of the molding material tends to act on the outer edge portion 22 of the metal separator 21 when the molding material is injected into the cavity portion 53 from the gate portion 54.

Further, because the metal separator 21 has a greater peripheral length in comparison to its thickness, a plurality of gate portions 54 are provided along a peripheral direction of the outer edge portion 22 of the metal separator 21. Reference numeral 32 in FIG. 1 indicates a gate trace which is left on the molded resin frame 31 after the molding process. Inasmuch as a plurality of (two in the drawing) gate traces 32 are illustrated, it is apparent that a plurality of gate portions 54 are provided along the peripheral direction of the outer edge portion 22 of the metal separator 21.

In the case that a plurality of gate portions 54 are provided along the peripheral direction of the outer edge portion 22 of the metal separator 21 as mentioned above, a weld portion 33 is set in the resin frame 31 which is molded by the cavity portion 53. The weld portion 33 is generated when the frame molding material provided by each of the gate portions combines. A combined flow pressure caused by the combined flow of the frame molding materials is generated in the weld portion 33. Therefore, the combined flow pressure tends to act on the outer edge portion 22 of the metal separator 21.

In the metal mold 51 shown in FIG. 4, a plurality of gate portions 54 are respectively arranged at positions which correspond to locations of the concave portions 24. Indeed, as shown in FIG. 1, the gate traces 32 are respectively provided at the positions that correspond to the locations of the concave portions 24 such that it is apparent that a plurality of gate portions 54 are arranged at the positions that correspond to the locations of the concave portions 24 when the metal separator 21 is set within the metal mold 51.

Further, the gates intermediate positions are respectively arranged at positions corresponding to the locations of the concave portions 24 in the concavo-convex shape 23. The gates intermediate positions are configured to generate the weld portion 33 in the resin frame 31, in the metal mold 51 shown in FIG. 4. In FIG. 1, the weld portion 33 is arranged at a position that corresponds to the location of the concave portion 24, which makes it apparent that the gates intermediate positions are respectively arranged at locations that correspond to the locations of the concave portions 24.

The metal mold 51 is structured as mentioned above. Further, the plate 11 with frame shown in FIG. 3 is manufactured by using the metal mold 51.

As mentioned above, the gate portion 54 is provided at a location that faces the outer edge thickness surface 22b of the metal separator 21, and is arranged at a location that corresponds to a location of the concave portion 24 when the metal separator 21 is placed in the metal mold 51. Therefore, the metal separator 21, at a location of the concave portion 24, directly faces the gate portion 54 and is deformed under the influence of the injecting pressure of the frame molding material which is injected from the gate portion 54. Since a portion having the concave portion 24 of the metal separator 21 is smaller in a protruding length protruding to an inner portion of the cavity in comparison with a portion having the convex portion 25 (L1<L2 on the assumption that L1 is a protruding length of the portion having the concave portion 24, and L2 is a protruding length of the portion having the convex portion 25), the portion having the concave portion 24 has a smaller amount of deformation even if deformed under the influence of an injecting pressure of the frame molding material.

More specifically, because concave portion 24 will be deformed under the influence of injecting pressure, even if the concave portion 24 is bent at the same angle as that in FIG. 8C, a leading end of the outer edge portion does not reach a surface (an upper surface in the drawing) of the resin frame 31. Moreover, the convex portion 25 that is adjacent to the concave portion 24 may also slightly deform when the concave portion 24 deforms under the influence of the injecting pressure; however, the convex portion 25 does not deform to the same extent because the convex portion 25 does not directly face the gate portion 54. Therefore, the leading end of the outer edge portion of the metal separator 21 at the convex portion will not deform to an extent that it will reach the surface (the upper surface in the drawing) of the resin frame. As a result, it is possible to prevent instances where the outer edge portion 22 of the metal separator 21 is deformed so as to be exposed at the surface in relation to the resin frame 31, which ensures that the insulation performance is not deteriorated.

Further, the gates intermediate position that generates the weld portion 33 in the resin frame 31 is arranged at a location that corresponds to a location of the concave portion 24 when the metal separator 21 is placed in the metal mold 51. Therefore, the metal separator 21 is deformed at the concave portion 24 under the influence of the combined flow pressure. Here, since the portion of the metal separator 21 having the concave portion 24 is smaller in the protruding length protruding into the inner portion of the cavity in comparison to the portion of the metal separator having the convex portion 25 (L1<L2 on the assumption that L1 is the protruding length of the portion having the concave portion 24, and L2 is the protruding length of the portion having the convex portion 25), the portion of the metal separator 21 at the concave portion 24 deforms to a lesser extent under the influence of the combined flow pressure.

More specifically, the leading end of the outer edge portion does not reach the surface (the upper surface in the drawing) of the resin frame 31 even if the portion of the metal separator 21 at the concave portion 24 is bent at the same angle as that of FIG. 8C. Moreover, the portion of the metal separator 21 at the convex portion 25 that is adjacent to the concave portion 24 also somewhat deforms when the concave portion 24 deforms; however, the convex portion 25 does not deform to the same extent because the convex portion 25 is at a location that is offset from the gates intermediate position. Therefore, the leading end of the outer edge portion does not reach the surface (the upper surface in the drawing) of the resin frame 31 at the convex portion 25. As a result, it is possible to prevent the outer edge portion 22 of the metal separator 21 from deforming to an extent that insulation performance is deteriorated.

Other Embodiment

Further, with respect to the deformation of the outer edge portion 22 of the metal separator 21 at the weld portion 33, it is thought that this deformation can be suppressed by enlarging the width of the resin frame 31 at the weld portion 33.

Figure 5:
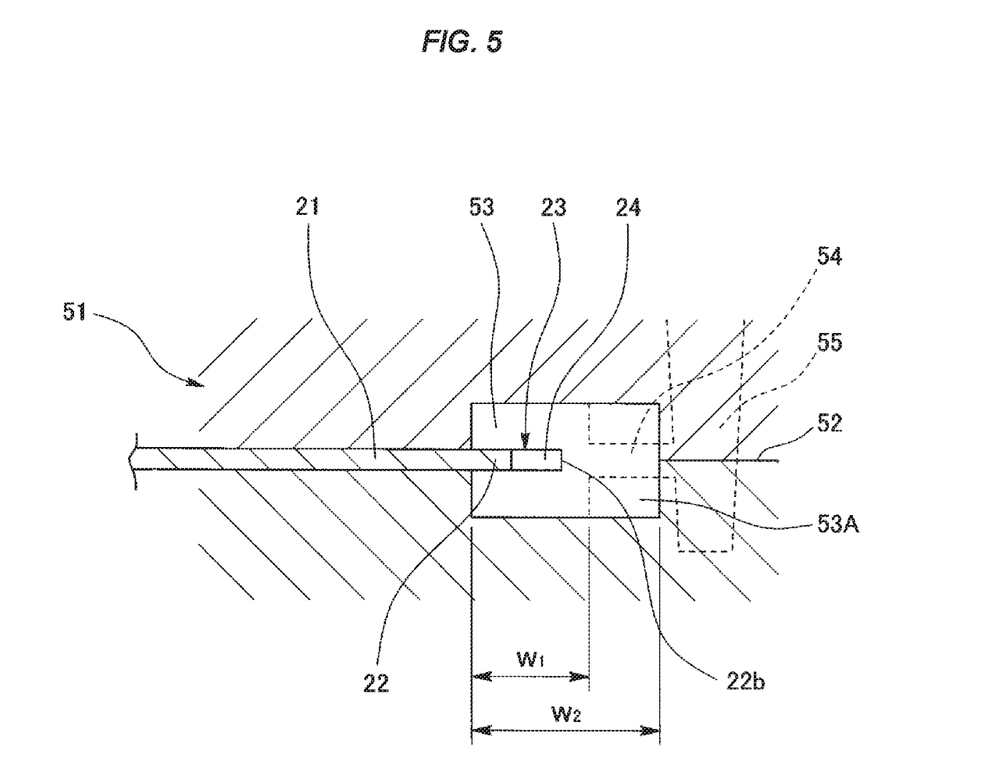
FIG. 5 is an explanatory view of a manufacturing step and shows the other example of the plate with frame.

More specifically, the metal mold 51 is provided with a circumferentially partial cavity width enlargement portion 53A by enlarging a width w2 of the cavity portion 53 toward an outer peripheral side in relation to a width w1 in the other portions, at the gates intermediate position where the weld portion 33 is generated in the resin frame 31, as shown in FIG. 5.

Figure 6:
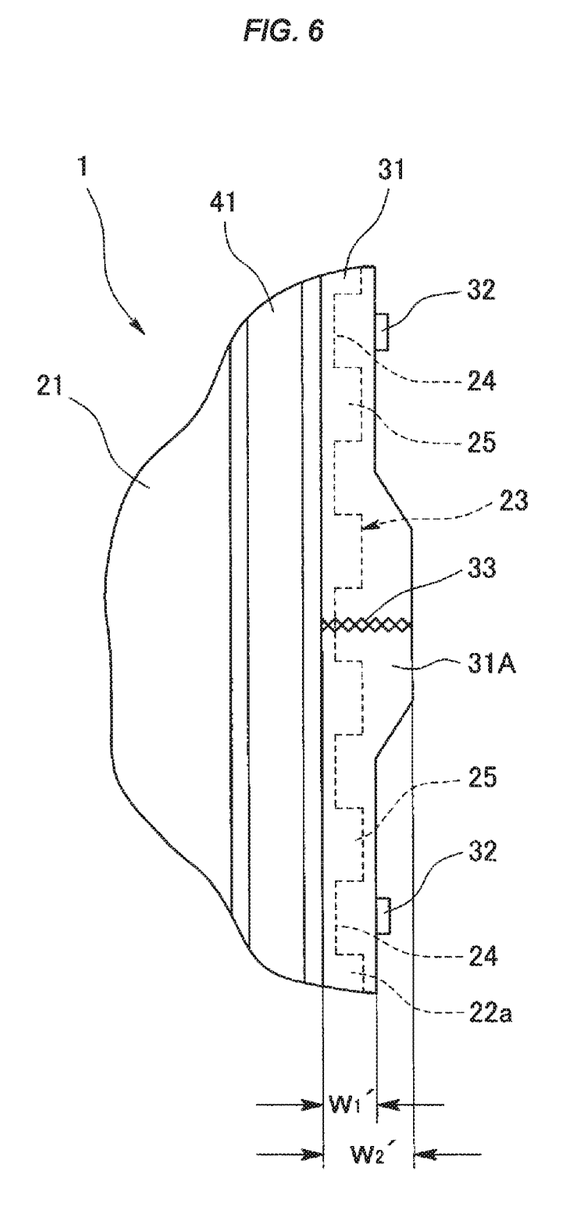
FIG. 6 is a partly plan view showing the other example of the gasket for the fuel cell (the plate integrated gasket)

Further, as shown in FIG. 6, the resin frame 31 molded by the metal mold 51 is provided with a circumferentially partly frame width enlargement portion (a swelling portion) 31A by enlarging a width of the resin frame 31 (a width of a portion including the weld portion 33) w2' toward an outer peripheral side in relation to a width w1' in the other portions, at the gates intermediate position where the weld portion 33 is generated.

Further, in the case that the frame width enlargement portion 31A is provided in the weld portion 33 of the resin frame 31 as mentioned above, it is possible to make a strength of the weld portion 33 where the strength is generally lowered in comparison with the other portions equal to the other portions, and it is possible to reduce a pressure difference between front and back sides of the weld portion 33. As a result, it is possible to suppress the deformation of the outer edge portion 22 of the metal separator 21 at the weld portion 33.

The planar shape of the frame width enlargement portion 31A is formed, for example, into a trapezoidal shape or an approximately trapezoidal shape which is inclined in both ends. The width w2' of the resin frame 31 including the frame width enlargement portion 31A has a relationship between 1.2 and 2 times the width w1' of the other portions, for example, a relationship of 1.5 times. A length of the frame width enlargement portion 31A is set to a length of one to two sets of combination of the concave portion 24 and the convex portion 25, for example, set to about 1.5 sets.

The entire disclosures of Japanese Patent Application No. 2015-142966 filed on Jul. 17, 2015 and Japanese Patent Application No. 2016-043271 filed on Mar. 7, 2016 are expressly incorporated by reference herein.

What is claimed is:

1. A method of manufacturing a plate with a frame by using a metal mold, comprising:
    providing a metal plate including an outer edge that has a concavo-convex shape;
    placing the metal plate in a metal mold that is provided with a cavity portion that is configured for receiving a frame molding material from a gate portion; and
    injecting the frame molding material into the metal mold to integrally mold a resin frame onto the outer edge portion of the metal plate, the frame molding material being injected in a direction toward an interior of the metal plate,
    wherein the gate portion is constructed by a plurality of gate portions that are provided at positions that face an outer edge thickness surface of the metal plate when the metal plate is placed in the metal mold, and the gate portions are arranged at positions that correspond to locations of the concave portions of the concavo-convex shape of the metal plate.

2. The method according to claim 1, wherein
    during injection of the frame molding material into the metal mold, weld portions are formed in the resin frame when the frame molding material provided by one gate portion meets the frame molding material provided by an adjacent gate portion, and a width of the resin frame in a plan view of the plate at the weld portion is greater than other portions of the resin frame.

3. The method according to claim 1, wherein the metal plate is a metal separator for a fuel cell, and
    the resin frame is a resin frame that is integrally molded on an outer edge portion of the metal separator.

4. The method according to claim 2, wherein the metal plate is a metal separator for a fuel cell, and
    the resin frame is a resin frame that is integrally molded on an outer edge portion of the metal separator.

* * * * *